United States Patent [19]

van Leeuwen

[11] 4,390,430
[45] Jun. 28, 1983

[54] APPARATUS FOR SCRAPING SLUDGE FROM THE SURFACE OF A BODY OF LIQUID

[75] Inventor: Johannes van Leeuwen, Santpoort, Netherlands

[73] Assignee: Esmil B.V., Amsterdam, Netherlands

[21] Appl. No.: 237,866

[22] Filed: Feb. 25, 1981

[30] Foreign Application Priority Data

Feb. 28, 1980 [NL] Netherlands ............................ 8001198

[51] Int. Cl.³ .................................................. B01D 21/04
[52] U.S. Cl. .................................................. 210/527
[58] Field of Search ................ 210/608, 525, 527, 531

[56] References Cited

U.S. PATENT DOCUMENTS 1,792,919  2/1931  Mieder ................................ 210/527
3,756,418  9/1973  Pentz et al. ......................... 210/527
4,144,173  3/1979  Pielkenrood ........................ 210/525

Primary Examiner—Ivars C. Cintins
Attorney, Agent, or Firm—Jon M. Lewis

[57] ABSTRACT

Sludge floating on the surface of liquid protrudes upwardly through a stabilization grid and is removed by scraping means into a gutter. In order to prevent the scraping means pushing the sludge back downwardly through the grid, the scraping means is provided with a knife which is driven in a forward movement towards the gutter and a return movement away from the gutter. In the forward movement the knife is tilted downwardly towards its free edge so as to cut the sludge and push it into the gutter. During the return movement, the free edge is raised above the grid.

7 Claims, 3 Drawing Figures

APPARATUS FOR SCRAPING SLUDGE FROM THE SURFACE OF A BODY OF LIQUID

BACKGROUND OF THE INVENTION

1. Field of the Invention

The invention relates to apparatus for scraping sludge from the surface of a liquid on which the sludge is floating, such as for example a sludge which is formed by flocculation of solid matter which is pushed up by flotation. We use the term "sludge" broadly to encompass scum or other floating solid matter.

2. Description of the Prior Art

In various techniques for water treatment a sludge mass is caused to float on the surface of a liquid and has to be removed. If the sludge contains valuable components, for example proteins from the waste water of slaughterhouses, it is important to remove the sludge as completely as possible, while at the same time it is desirable that the dry matter content of the sludge removed is as high as possible in order that the process of recovery is economical.

This kind of sludge is, in some known processes, obtained as a result of a flocculation and subsequent flotation treatment of the waste water. The protein-containing matter is, for example, first flocculated and then pushed up to the surface by means of air bubbles, so that a sludge mass is formed on the top of the fluid. It has to be noted, however, that the invention is not limited to this method of formation of a sludge mass; the layer of sludge can be formed in a different manner.

The techniques of flocculation and flotation are sufficiently well known in themselves that they do not need further explanation in this specification.

It has already been suggested that use should be made of the so-called stabilisation grid. This is a grid which is mounted at the surface of the liquid and which restricts the movement of the sludge at the surface. The purpose of this is to increase the content of dry matter in the upper layer of the sludge and to prevent too strong a stirring action in the sludge layer during scraping of the sludge from the liquid. Scrapers which move transversely over the grid are used in combination with the existing stabilisation grids.

There are objections to these existing systems. A significant part of the sludge layer which is already dry and which protrudes above the grid is pushed back below the grid by the scraper blades during the movement of the scraping mechanism. The stability of the sludge layer is disturbed by this downward motion. This is particularly disadvantageous for the following reason. When the sludge which already contains a high content of dry matter is pushed back under water, part of it, which has a specific gravity of more than one, again settles down in the liquid. After it has settled down this sludge is carried away with the effluent from the process, which firstly means a loss of a certain amount of the separated sludge and secondly increased pollution of the effluent. The sludge which has settled in this manner possesses a different structure from the freshly flocculated matter and because of this cannot be floated a second time.

SUMMARY OF THE INVENTION

The object of the invention is to prevent or minimise the pushing back of the sludge by the moving scraper parts in order to achieve a high dry matter content of the sludge which is removed, so that the costs necessary for removal of remaining water can be lower. It is also sought that no sludge particles from the sludge layer drain back into the fluid, so that the effluent contains less sediment.

The invention as claimed is intended to provide a solution. The invention proposes the use of a knife. Thus the top, and dryest part of the sludge layer is not scraped, but is cut off and is then transported in one single movement to the sludge gutter. As the knife is kept raised during the return movement, it is not in contact with the sludge layer, which is therefore not pushed down.

Preferably the knife is attached by a hinge to its suport and driving means and the sludge gutter is provided with a rim or overspill edge over which the knife can slide in order to then tilt downwards at the extreme end of its forward movement. Because of this, the cut-off sludge mass remains on the knife until it falls downwards into the sludge gutter.

Various movement systems are feasible to keep the knife raised during the return movement. It is for example possible to control the position of the knife during the return movement by cams which slide in guides. A simple and inexpensive construction is preferred in which the support means include an electromagnet which is actuated during the return movement and can therefore keep the knife in a raised position.

Various arrangements are also possible for the driving means for the knife. This could be for example a system of rods and pistons, or an eccentric system. A simple but effective and easily adjustable arrangement is preferred in which the drive means has an electric motor (coupled for example by chains and a reducing gearbox to the knife), with the reversal of the direction of rotation of the motor and the frequency of the scraping movements being adjustable with the aid of limit switches for the end positions of the knife movement and e.g. a time-delay relay. Reversible linear movements to which limit switches have been applied are sufficiently well known that it is not necessary to describe this system of motion in detail.

BRIEF INTRODUCTON OF THE DRAWINGS

A preferred embodiment of the invention is now described by way of non-limitative example with reference to the accompanying drawing, in the different Figures of which the corresponding elements are indicated by identical reference numbers.

DESCRIPTION OF THE PREFERRED EMBODIMENT

Figure 1:
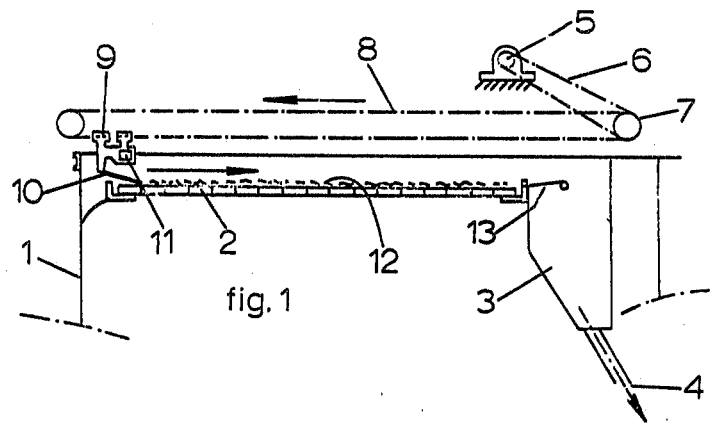
FIG. 1 shows the apparatus embodying the invention at the start of the scraping movement.

In FIG. 1 a tank 1 for liquid is shown in which a sludge layer is formed at the surface of the liquid contents by flocculation and flotation. Since, it is not essential for the understanding of the invention, the Figure does not show how the flocculation and flotation are performed in order to form a sludge layer.

At the level of the liquid surface in the tank 1, a stabilisation grid 2 is installed. This stabilisation grid 2 consists of strips which are placed transversely over each other in a square pattern. Connected to this stabilisation grid is a sludge gutter 3, with an outlet drain 4, indicated schematically, for the sludge collected.

A permanently fixed electric motor with a reducing gearbox 5 is drivingly connected to a knife support 9 by a chain 6 and a chain 8 which are led over guide rollers 7. The motor 5 is of the type in which the direction of rotation can be reversed. A knife 10 is hingedly attached to the support 9 at its rear longitudinal edge which is opposite its longitudinal free edge which forms the cutting edge.

Figure 2:
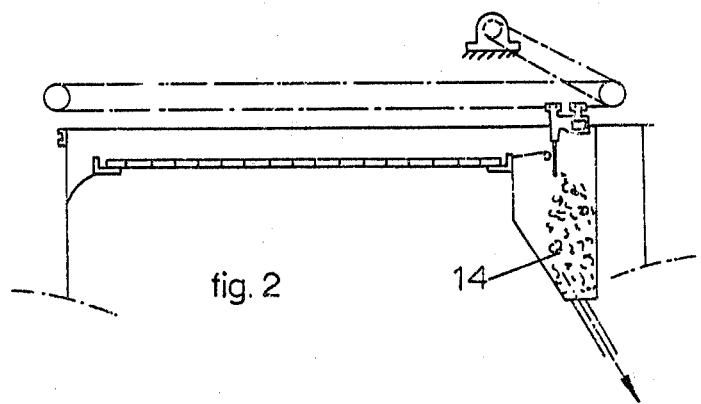
FIG. 2 shows the same apparatus at the completion of the scraping movement.

In the position indicated in FIG. 1 the knife 10 rests on guide rails on the stabilisation grid 2 so that the knife is tilted downwardly at an acute angle to the grid 2 towards its cutting edge. When the motor 5 is then actuated, the support 9 is moved to the right in the Figure, so that knife 10 cuts the part of the sludge layer protruding above the stabilisation grid 2. At the end of the stabilisation grid the knife runs up over an overspill edge or rim 13, tilts over this edge and being freely hinged, drops down (see FIG. 2). On this tilting of the knife 10, the sludge 14 collected on the knife falls down into the sludge gutter 3.

Figure 3:
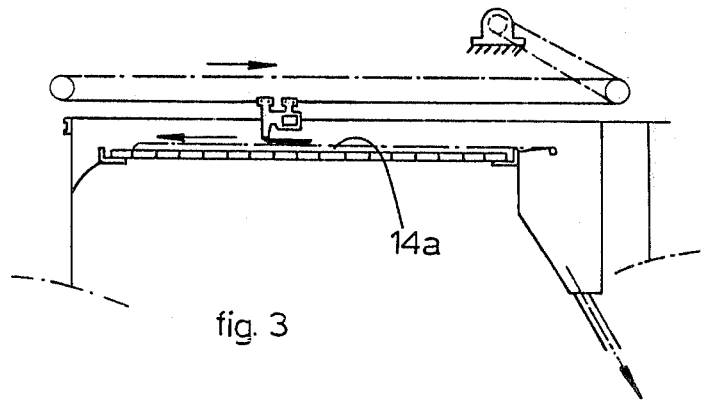
FIG. 3 shows the apparatus during the return movement.

After this the direction of rotation of motor 5 is reversed, the support 9 moves to the left and at the same time an electromagnet 11 which is attached to the support 9, is actuated, so that the knife 10 is moved back upwardly by the overspill edge 13 and held by the magnet 11 in a position which is higher than the level 14a up to which the sludge can reach through the grid (FIG. 3).

The support 9 continues to move to the left until it reaches the beginning of the stabilisation grid, where the direction of rotation of the motor 5 is reversed again.

This reversal of the direction of rotation of the motor 5 can be obtained simply by fitting limit switches at the extreme positions reached by the support 9. These limit switches reverse the polarity of the power supplied to the motor 5, in a well known manner.

In a manner which is also known in itself a time delay relay can be incorporated in the control circuit of the motor 5, by which the actuation of the motor 5 can be adjustably delayed after the support 9 has actuated the limit switch at the beginning of the grid. In this way the number of strokes per unit time of the knife 10 can be adjusted as necessary. Neither the limit switches, nor the time delay relay are indicated in the Figures, since their construction and arrangement will be of no difficulty to the skilled man.

What is claimed is:

1. Apparatus for scraping sludge from the surface of a body of liquid on which the said sludge is floating, comprising
    (a) a container for the liquid,
    (b) a sludge stabilization grid mounted in the container so as to be, in use of the apparatus, adjacent the surface of the liquid so that the floating sludge protrudes upwardly through the grid,
    (c) a sludge gutter extending alongside said container to receive sludge removed from the liquid surface,
    (d) a knife for removing said sludge protruding through the grid having a longitudinal free edge,
    (e) drive means for moving said knife in a forward movement across said grid towards said gutter and in a return movement away from said gutter, and
    (f) support means for said knife adapted and arranged so that (i) the knife is in a working position tilted downwardly towards said free edge during said forward movement in order to cut the sludge protruding through the grid and push it into the gutter and (ii) the knife is in a retracted position during said return movement with said free edge raised above its level adopted in said working position wherein said support means includes an electromagnet which is actuable during said return movement in order to maintain the knife in said retracted position.

2. Apparatus according to claim 1 wherein said drive means includes a reversible electric motor connected to said support means in order to drive the knife in said forward and return movements, limit switches arranged at end positions of said forward and return movements so as to be respectively actuated when the knife reaches the ends of said movements and control means for said electric motor arranged to control reversal of said motor in dependence on signals from said limit switches, said control means including adjustable delay means for setting the frequency of the scraping movements of the knife.

3. Apparatus for removing floating sludge from a body of liquid in a container, wherein a sludge-stabilization grid is mounted on the surface of the body of liquid so that said sludge protrudes and floats above the grid, said apparatus comprising:
    (a) a sludge gutter extending alongside said container to receive sludge removed from the liquid surface;
    (b) a knife comprising a hinged blade depending from a substantially horizontal hinge for cutting and removing sludge which is protruding above said grid;
    (c) drive means for moving said hinged blade in a substantially horizontal plane causing a forward movement of the blade across said grid towards said gutter, and for also causing a return movement of the blade away from the gutter in the same said horizontal plane;
    (d) movable support means for said knife, supporting said knife in a cutting position in a plane substantially in the direction towards the gutter during said forward movement so as to cut the sludge protruding through and above the grid and push the sludge into the gutter at an end of the forward movement, and
    (e) holding means to hold the knife in a hingedly retracted position during said return movement of the blade.

4. Apparatus as in claim 3 wherein said forward movement of the blade ends beyond a region of the grid and within the gutter, so that the hinged blade becomes vertical in the gutter by its own gravity.

5. Apparatus as in claim 4 wherein said holding means includes an electromagnet which is actuable to hold the knife hingedly in an upward retracted position.

6. Apparatus as in claim 5, including limit switches to control said forward and return movement of the blade.

7. Apparatus for scraping sludge from the surface of a body of liquid on which the said sludge is floating, comprising:
    (a) a container for the liquid,
    (b) a sludge stabilization grid mounted in the container so as to be, in use of the apparatus, adjacent the surface of the liquid so that the floating sludge protrudes upwardly through the grid,
    (c) a sludge gutter extending alongside said container to receive sludge removed from the liquid surface, (d) a knife with a hinged blade depending from a substantially horizontal hinge for removing said sludge protruding through the grid, said blade having a longitudinal free edge, (e) drive means for moving said knife in a plane, causing a forward movement across said grid towards said gutter and in a return movement away from said gutter in the same said plane, and (f) movable support means for said knife adapted and arranged so that the knife stays in a cutting position tilted downwardly towards said free edge during said forward movement in order to cut the sludge protruding above and through the grid and push it into the gutter and means to hold the knife hingedly in a retracted position during said return movement with said free edge raised above its level in said cutting position.

* * * * *